C. PEARSON.
SWEEP RAKE.
APPLICATION FILED MAY 27, 1909.
958,432. Patented May 17, 1910.
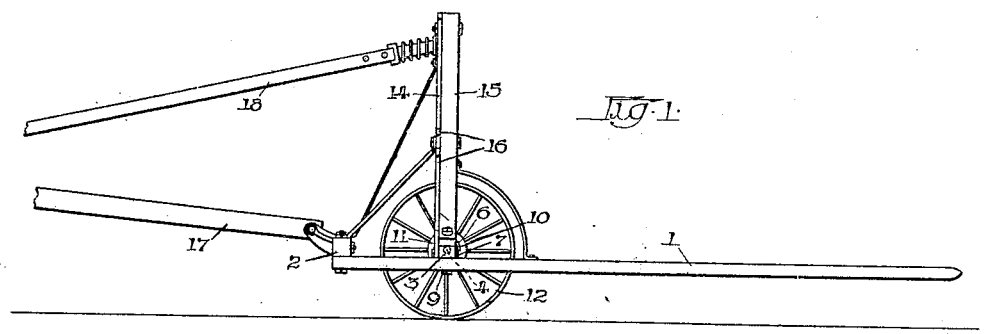
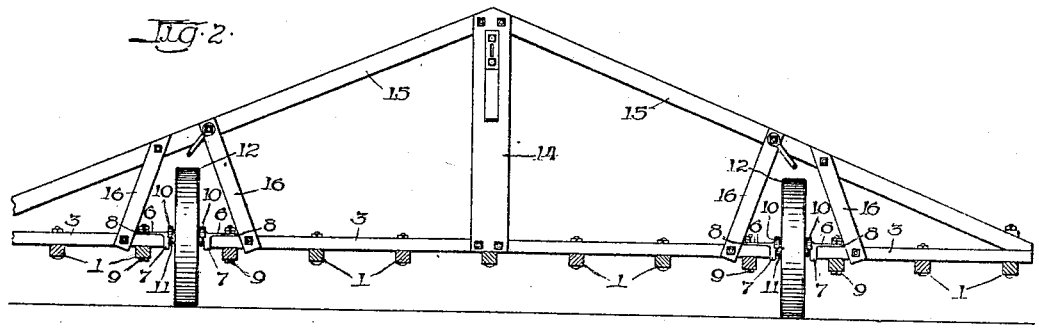
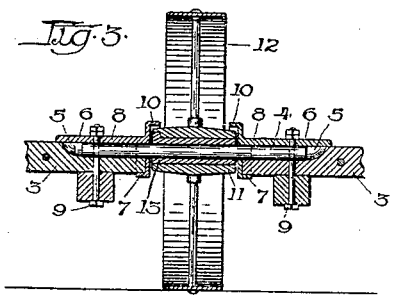
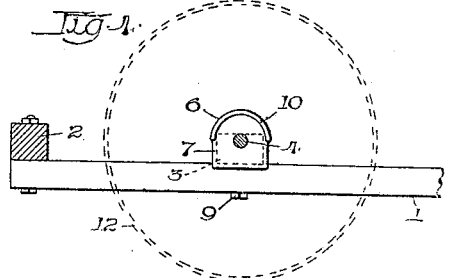
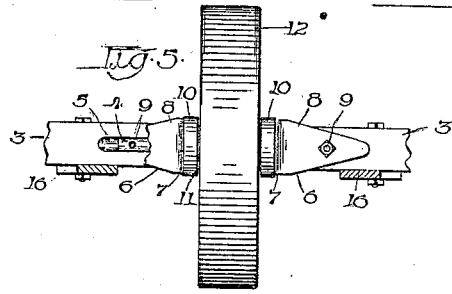
Witnesses:
F. W. Hoffmeister
H. J. Jasmer
Inventor
Charles Pearson
By E. W. Burgess
Attorney

UNITED STATES PATENT OFFICE.

CHARLES PEARSON, OF CHICAGO, ILLINOIS, ASSIGNOR TO INTERNATIONAL HARVESTER COMPANY, A CORPORATION OF NEW JERSEY.

SWEEP-RAKE.

958,432.  Specification of Letters Patent.  Patented May 17, 1910.

Application filed May 27, 1909. Serial No. 498,714.

*To all whom it may concern:*

Be it known that I, CHARLES PEARSON, a citizen of the United States, residing at Chicago, in the county of Cook and State of Illinois, have invented certain new and useful Improvements in Sweep-Rakes, of which the following is a specification.

My invention relates to sweep rakes having carrying wheels, its object being to provide an improved construction of supporting axle and frame that will be strong, simple and comprising few parts. I attain this object by means of the mechanism illustrated by the accompanying drawing, in which—

Figure 1 is a side elevation of part of a sweep rake embodying my invention; Fig. 2 is a rear sectional elevation of part of Fig. 1; Fig. 3 is a cross section of a carrying wheel and the means by which its axle is connected with the rake frame members; Fig. 4 is a detached detail representing a side elevation of Fig. 3; and Fig. 5 is a top plan view of Fig. 3.

The same reference characters designate like parts throughout the several views.

1 represents the rake teeth, having their rear ends secured to a transverse bar 2, and 3 represents a sectional bar secured to the teeth forward of bar 2, the sections being connected together by means of axle members 4, having their opposite ends received by longitudinal grooves 5 formed in adjacent ends of the sections and supported by means of members 6, having socket portions 7 adapted to receive the ends of the sectional bar and axles. Longitudinally arranged wing portions 8, extending outward from the sockets and overlapping the ends of the bars, are provided with openings adapted to receive securing bolts 9 that pass through the axles and the sections of the bar, and also the rake teeth near the adjacent ends of the connected sections; and 10 represents semicircular dust bands projecting inward from the upper sides of the sockets and partially encircling the ends of the hub portions 11 of carrying wheels 12, the hubs being provided with removable bushings 13 that are journaled upon the axle members 4.

14 represents a vertically arranged strut, having its lower end secured to the center of the middle section of bar 3, and 15 represents truss frame members having their inner and upper converging ends secured to the upper end of the strut, and their lower and outer ends to the outside sections of bar 3.

16 represents supplemental truss members arranged upon opposite sides of the wheels and having their upper converging ends secured to the truss frame members 15, and their lower ends to separate sections of the bar 3.

17 represents a part of the rake propelling means, and 18 a part of a rake controlling bar.

What I claim as my invention, and desire to secure by Letters Patent, is:

1. A sweep rake including, in combination, rake teeth, a rake supporting frame having said teeth secured thereto, said frame including a transverse sectional bar comprising separable members having the adjacent ends of its sections connected by means of axle members, and carrying wheels journaled upon said axles.

2. A sweep rake including, in combination, rake teeth, a rake supporting frame having said teeth secured thereto, said frame including a transverse sectional bar having the adjacent ends of its sections connected by means of axle members, said axle members having the opposite ends thereof supported by members having socket portions adapted to receive the ends of the sectional bar, and longitudinally arranged wing portions adapted to receive bolts passing through said axles and bar, and carrying wheels journaled upon said axles.

3. A sweep rake including, in combination, rake teeth, a rake supporting frame having said teeth secured thereto, said frame including a transverse sectional bar having the adjacent ends of its sections connected by means of axle members, carrying wheels journaled upon said axles, a strut having its lower end secured to the middle portion of said sectional bar, truss frame members having their upper converging ends secured to the upper end of said strut and their lower ends to the outer ends of said sectional bar, and supplemental truss frame members connecting said first mentioned truss frame members with said sectional bar upon opposite sides of said carrying wheels.

CHARLES PEARSON.

Witnesses:
RAY PATTISON,
RAY D. LEE.